Oct. 20, 1953 L. LEBLANC Re. 23,725
KEY MECHANISM FOR ALTO AND BASS CLARINETS
Original Filed Aug. 19, 1950
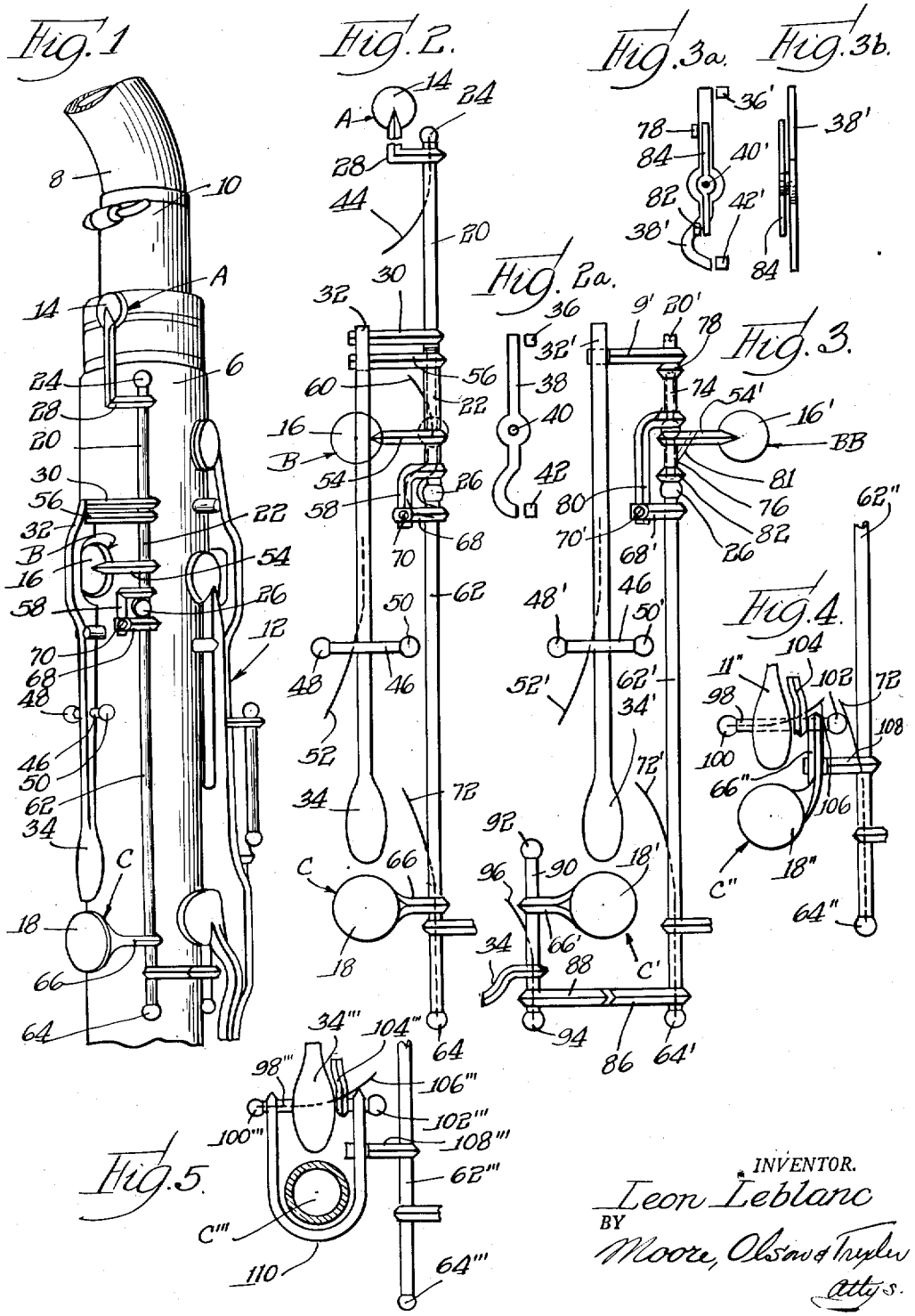
INVENTOR.
Leon Leblanc
BY
Moore, Olsen & Taylor
Attys.

Reissued Oct. 20, 1953

Re. 23,725

UNITED STATES PATENT OFFICE 23,725

KEY MECHANISM FOR ALTO AND BASS CLARINETS

Leon Leblanc, Paris, France

Original No. 2,627,776, dated February 10, 1953, Serial No. 180,454, August 19, 1950. Application for reissue July 9, 1953, Serial No. 367,124

6 Claims. (Cl. 84—382)

Matter enclosed in heavy brackets [ ] appears in the original patent but forms no part of this reissue specification; matter printed in italics indicates the additions made by reissue.

This application comprises a continuation-in-part of my copending application Serial No. 742,966, filed April 21, 1947, now abandoned. The invention relates to clarinets, particularly to alto bass and contrabass clarinets.

Alto bass and contrabass clarinets, hereinafter referred to simply as alto and bass clarinets, comprise generally an upper and a lower joint having tone holes and keys on both joints and various interconnections between the joints. The lower joint is provided at its lower end with an upturned bell and the upper joint is provided with a curved neck extending upwardly from the upper joint and then back down upon itself, the downwardly curved portion being omitted in the alto clarinet, and finally rearwardly to the mouth piece of the instrument.

Heretofore, it has been necessary to provide a tone hole in the curved neck of the instrument which has been operable in conjunction with the fundamental B flat hole to provide certain of the third harmonics. The provision of a tone hole in the neck has required a mechanical linkage between the neck and the upper joint. This linkage has rendered the construction of alto and bass clarinets intricate and expensive and the linkage or interconnection is readily thrown out of adjustment if the connecting members on the upper joint and neck are not perfectly aligned when the neck is assembled with the joint.

In conventional alto and bass clarinets it further has been found necessary to provide an extra linkage between the upper and lower joints of the instrument in order alternately to open and close the two 12th holes to obtain all of the harmonics as desired. The extra linkage between the upper and lower joints has been subject to the criticism heretofore made with regard to the linkage of the upper joint and the neck. Additionally, the linkage between the upper joint and the neck, and more particularly the extra linkage between the upper and lower joints, transmit motion over relatively long distances and the linkage has been beset with considerable lost motion. This has made certain passages, for example trills from A to E, D to F, etc., difficult and sometimes impossible to perform properly and has led to a heavy, "mushy" touch, particularly in the A to E key, third finger right hand.

A further drawback heretofore found in conventional alto and bass clarinets has been in the interdependence of the fundamental B flat key cup and the key cup for closing the twelfth hole so that swelling of one of the pads often reacts on the other.

An object of this invention is to provide improved mechanism in alto and bass clarinets for obviating the above noted difficulties.

A more specific object of this invention is the provision of a twelfth hole, key cup, and associated linkage all on the upper joint for producing all of the third harmonics without the necessity of a tone hole on the neck of such clarinet.

A further object of this invention is the provision in an alto or bass clarinet of construction as set forth in the foregoing object wherein the mechanism set forth comprises a single direct linkage between the register or twelfth key and the thumb key only, thus being confined entirely to the upper joint of the clarinet and eliminating all register key linkage to any other keys and particularly eliminating such linkage between the upper and lower joints of the clarinet.

Another object of this invention is the provision in alto and bass clarinets of mechanisms for closing the fundamental B flat and twelfth holes which are entirely independent of one another.

*A further important object of this invention is the provision in alto and bass clarinets of means for opening the twelfth or octave hole in response to actuation of the spatula key and F sharp key cup, said means being independent of the A flat key.*

Other and further objects and advantages of the present invention will be apparent from the ensuing description when taken in conjunction with the accompanying drawings wherein:

Fig. 1 is a fragmentary perspective view showing a part of the upper joint and neck of an alto or bass clarinet with structure embodying the principles of my invention applied thereto;

Fig. 2 is a somewhat schematic layout of my improved mechanism;

Fig. 2a is a view showing part of the mechanism of Fig. 2 directly to the left thereof with the overlying parts omitted;

Fig. 3 illustrates a modification of the structure shown in Fig. 1;

Fig. 3a is a view similar to Fig. 2a showing part of the mechanism of Fig. 3 in plan;

Fig. 3b is an elevational view of the mechanism shown in Fig. 3a;

Fig. 4 is a further modification; and

Fig. 5 is still another modification.

Referring first to Figs. 1 and 2, an alto or bass clarinet is shown in part comprising an upper joint 6 and a neck 8 secured thereto in suitable fashion as by a clamping ring 10. Conventional mechanisms including certain of the trill keys are indicated generally at 12. In conventional alto and bass clarinets, some less satisfactory means than the clamp 10 is used for securing the neck 8 to the upper joint 6 and a twelfth hole is provided in the neck approximately where the top of the clamp 10 shown is located and linkage is provided between the key cup closing this hole and an actuating member on the upper joint 6.

In the drawings the most pertinent parts comprise the key cup 14 closing on the twelfth hole A, the key cup 16 closing on the B flat hole, and the plateau key 18 closing on the F sharp hole C.

A pair of hinge rods 20 and 22 are pivoted between posts 24 and 26 and the rod 20 has a lever arm 28 connected to it as by soldering, welding, or brazing. The lever arm 28 is L-shaped and carries at its upper end the key cup 14. A lever arm 30 is connected to the hinge rod 20 at the lower end thereof and the end of the lever arm 30 rests beneath the extending arm or stem 32 of spatula 34.

Beneath hinge rod 20 there is a spur 36 (Fig. 2a) directing the movement of a swivel 38 pivoted at 40 beneath the hinge rod 22. A second spur or stop 42 is provided adjacent the other end of the swivel. A light tensioned needle spring secured beneath the rod 20 is indicated somewhat schematically at 44 and raises lever arm 28 and thereby key cup 14.

The stem 32 and spatula 34 previously referred to are integral and are soldered, brazed, welded or otherwise suitably affixed to hinge rod 46 pivoted between posts 48 and 50. Spatula 34 is maintained in raised position by a flat spring indicated schematically at 52 which is of sufficient strength to overcome the tension of spring 44 and another spring yet to be disclosed to maintain key cups 14 and 16 in closed position.

The key cup 16 is secured on the end of a lever arm 54 suitably fixed to the hinge rod 22. A lever arm 56 is suitably secured to the hinge rod 22 near the upper end thereof and an angle arm 58 is secured to this hinge rod near the lower end thereof. A light tensioned needle spring 60, being the second spring noted which is overcome by the tension of flat spring 52, is mounted beneath the hinge rod 22 and acts to raise key cup 16, lever 56, and angle arm 58.

A hinge rod 62 is pivoted between the post 26 and a second post 64. The plateau key 18 is fixed to the hinge rod 62 by a lever arm 66 and a lever arm 68 fixed to the upper end of the hinge rod 62 rests atop a flattened portion of the angle arm 58, a screw 70 being provided in the lever arm 68 and bearing on the angle arm 58 for adjustment therebetween. The spur 42 cooperable with the lower end of the swivel 38 is secured to the lever arm 68 just below the hinge rod 62.

A needle spring 72 of greater tension than the spring 44 is located beneath the hinge rod 62 and maintains the plateau key 18 and the lever arm 68 in raised position. This serves also to maintain the spur 42 against the lower end of the swivel 38 which thus is turned about its pivot 40 to bear against the spur 36 of the lever arm 30 to keep the key cup 14 closed.

It may be seen that key cup 14 closes the twelfth hole A under the influence of the spring 72 beneath the hinge rod 62, by the spring 52 of spatula 34, or by both of these springs at the same time. As either of these springs is sufficient to maintain the key cup 14 in closed position, this cup will not be raised to expose the twelfth hole A except when the thumb presses on the spatula 34 and plateau key 18 at the same time. When both of these members are pressed simultaneously, the spur 42 is moved to the right to free swivel 38 and lever arm 68 pushes angle arm 58 down to close key cup 16 against the B flat hole B. The depression of spatula 34 frees lever arm 30 and with the lever arm 30 free and the spur 36 free of the swivel 38, the needle spring 44 raises the key cup 14 to open the twelfth hole A to obtain the desired harmonics.

When the plateau key 18 alone is depressed, the swivel 38 is freed but the lever arm 30 is still under the restraint of stem 32 and the other biasing spring 52 so that key cup 14 cannot rise to open the twelfth hole A.

If spatula 34 only is depressed, lever arm 56 will be freed and spring 60 will raise key cup 16, it being understood that screw 70 carried by lever arm 68 is not at this time contacting angle arm 58, to free the B flat hole B to allow the fundamental to sound. It may be seen that the key cup 16 is completely independent of any other key and thus cannot react upon any other key upon swelling of the pad. The complete independence of this key cup affords a musician the greatest ease of playing with a maximum feeling of security.

In order that those skilled in the art may more fully appreciate and understand my invention, I set forth the following by way of example but not as a limitation. I have found in an alto clarinet that the B flat hole may advantageously be 6.2 mm. in diameter. The tube or hole plug for the twelfth hole of an alto clarinet may be 12 mm. in length and have an internal diameter of 2 mm., the outside diameter of the tube tapering uniformly from 4.0 mm. at the outer end to 3.8 mm. at the inner end. In a bass clarinet the B flat hole should be 8.5 mm. in diameter. The length of the twelfth tube should be 14 mm. with an internal diameter of 2.5 mm. in the outer 10 mm. of the tube, the inner diameter thereafter increasing uniformly to 4.7 mm. The outside diameter of the tube tapers uniformly from 5.5 mm. at the outer end to 5.3 mm. at the inner end.

Referring next to the modification shown in Figs. 3, 3a and 3b, the B flat hole B may be seen to be eliminated and the key cup 16′ is located over the B flat trill hole BB. In order to make this construction possible, the hinge rod 22 is divided into two sections 74 and 76. The hinge rod section 74 has secured to it as by welding, brazing, or soldering a spur 78 (Fig. 3a), an angle arm 80 and a lever arm 9′ similar to the lever 56 previously disclosed. The section 76 has secured to it a spur 82 and a lever arm 54′ carrying the key cup 16′. A light spring 81 acts to raise key cup 16′. A small swivel 84 is located beneath hinge rods 74 and 76 and is superimposed on swivel 38′ and pivots about the same pivot 40′ as the latter swivel. The manner in which the swivels are superimposed is best seen in the top view of Fig. 3a and the elevation of Fig. 3b.

A lever arm 86 is secured to hinge rod 62′ for cooperation with a lever arm 88 secured to the hinge rod 90 on which is mounted the lever arm 66′ of plateau key 18′. Hinge rod 90 is pivotally mounted between posts 92 and 94 and is biased by a very light spring 96 to keep the levers 88 and 86 in constant contact. Upward movement of plateau key 18′ and lever arm 88 is limited by a stop 34 extending transversely of the hinge rod 90 and abutting the body of the clarinet. Other parts of the mechanism shown in Figs. 3, 3a, and 3b are similar to those shown in Fig. 1 and are identified by similar numerals marked with a prime.

Depression of the plateau key 18′ acts through levers 88 and 86, and hinge rod 62′ to depress lever 68′ in the same manner as in Fig. 1. Stem 32′ of spatula 34′ acts through lever arm 9′, spur 78, small swivel 84, spur 82, hinge rod 76, and lever arm 54′ to close key cup 16′ against the B flat hole BB. Operation of the twelfth hole mechanism is similar to that of the mechanism in Fig. 1.

A further modification of the invention is shown in Fig. 4 and is operable with the mechanism of either Figs. 1 and 2 or 3. A hinge rod 98 is pivoted between posts 100 and 102. Plateau key 18″ is connected by means of a lever arm 66″ to the hinge rod 98 and a stop 104 is likewise secured to this hinge rod. A small, light tensioned spring 106 maintains a lever arm 66″ of plateau key 18″ in contact with a short lever arm 108 secured to hinge rod 62″. Further parts shown in Fig. 4 are identical with those shown in Figs. 1, 2 and 3 and are similarly numbered with the addition of a double prime. In the modification of Fig. 5, the plateau key cup 18 has been replaced by a stirrup 106 and the F sharp hole C‴ is closed by the thumb of the musician. The two ends of the stirrup 110 are soldered to a hinge rod 98‴ as is a stop 104‴, the hinge rod being biased by a light spring 106‴ and being mounted between two posts 100‴ and 102‴. Operation of the modification of Fig. 5 is similar to that heretofore described and should be obvious.

The particular features of my invention which I wish to call to mind before closing include the provision of the single twelfth hole on the upper joint of an alto or bass clarinet for sounding the harmonics with all of the operating mechanism for the twelfth hole being mounted on the same upper clarinet joint thereby eliminating linkage between the upper joint and the neck and between the upper joint and the lower joint. A further important feature to be borne in mind is the independence of the keys for the twelfth hole and the B flat hole. *The twelfth hole or octave hole is opened by simultaneous depression of the spatula key and the F sharp key cup. This operation is independent of the A flat key in distinction to many previous bass clarinets.*

The specific mechanism shown embodying these features are to be understood as illustrative rather than limiting and my invention is to be limited only to the spirit and scope of the following claims.

I claim:

1. Tone producing mechanism for alto and bass clarinets of the type having upper and lower body joints and a curved neck extending from said upper joint, said tone producing mechanism including means defining a twelfth hole in said upper joint adjacent the upper edge thereof, said upper joint having a B flat tone hole and another tone hole spaced below said twelfth hole, a pivotally mounted hinge rod, a lever arm extending transversely and longitudinally of said hinge rod beyond one extremity of said hinge rod, a twelfth hole closing pad on the end of said lever, an actuating lever on said hinge rod, a second pivotally mounted hinge rod, a second actuating lever on said second hinge rod, a B flat tone hole closing pad, a lever interconnecting said last mentioned pad and said second hinge rod, means resiliently biasing said twelfth hole closing pad into hole closing position about the longitudinal axis of said hinge rod, means resiliently biasing said B flat tone hole closing pad into hole closing position, a manually operable key lever overlying said first and second actuating levers, means resiliently biasing said key lever against said actuating levers, a third pivotally mounted hinge rod, a lever operable upon closing said other tone hole to pivot said third hinge rod about its longitudinal axis, resilient means normally biasing said third hinge rod in an oppositely pivoted direction, an interconnection between said first and third hinge rods preventing opening of said twelfth hole when said third hinge rod is in its normally resiliently pivoted position and an interconnection between said second and third hinge rods preventing opening of said B flat tone hole when said third hinge rod is pivoted against its resilient biasing means by closing of said other tone hole.

2. Tone producing mechanism as set forth in claim 1 wherein the three pivotally mounted hinge rods are substantially aligned and said twelfth hole, said B flat tone hole, and said other tone hole are substantially aligned and lie to one side of said hinge rods.

3. Tone producing mechanism as set forth in claim 1 wherein the three pivotally mounted hinge rods are substantially aligned, said twelfth hole and said other tone hole lie on one side of said aligned hinge rods, and said B flat tone hole lies on the opposite side of said rods.

4. In alto and bass clarinets of the type having upper and lower joints and a curved neck extending from the upper joint without a tone hole therein, the provision of tone producing mechanism comprising an octave hole in the upper joint adjacent the upper edge thereof, an octave pad for controlling the octave hole, an L-shaped link carrying said octave pad at the upper end thereof, an upper longitudinal hinge rod to which the other end of said L-shaped link is attached for pivotal movement of the pad about the longitudinal axis of said upper hinge rod, a B flat hole below said octave hole and at the same side of said upper hinge rod, *intermediate and lower hinge rods axially aligned with said upper hinge rod,* a B flat key cup for controlling the B flat hole, a link connecting said B flat key cup to said [upper] *intermediate* hinge rod for similar pivotal movement in controlling the B flat opening[, intermediate and lower hinge rods axially aligned with said upper hinge rod], an F sharp hole, an F sharp key cup controlling the F sharp hole and connected to said lower hinge rod by a transverse link for pivotal movement about the axis thereof, a spatula key extending parallel to said hinge rods with the finger portion thereof disposed adjacent the F sharp key cup, links extending transversely of the upper and intermediate hinge rods into cooperative position with respect to the adjacent end of said spatula key, separate spring means tending to close the octave pad whereby separate operation of the spatula key or the F sharp key cup will not result in opening of the octave pad, and further spring means operable to open the octave pad upon simultaneous depression of both of said F sharp key cup and said spatula key whereby the transverse links connected to the upper and [lower] *intermediate* hinge rods are released.

5. *Tone producing mechanism for alto and bass clarinets of the type having a body and a curved neck extending therefrom, said tone producing mechanism including means defining a twelfth hole in said body adjacent the upper edge thereof, said body having a B flat tone hole and another*

*tone hole spaced below said twelfth hole, a pivotally mounted hinge rod, a lever arm extending transversely of said hinge rod, a twelfth hole closing pad on the end of said lever, an actuating lever on said hinge rod, a second pivotally mounted hinge rod, a second actuating lever on said second hinge rod, a B flat tone hole closing pad, a lever interconnecting said last mentioned pad and said second hinge rod, means resiliently biasing said twelfth hole closing pad into hole closing position about the longitudinal axis of said hinge rod, means resiliently biasing said B flat tone hole closing pad into hole closing position, a manually operable key lever overlying said first and second actuating levers, means resiliently biasing said key lever against said actuating levers, a third pivotally mounted hinge rod, a lever operable upon closing said other tone hole to pivot said third hinge rod about its axis, resilient means normally biasing said third hinge rod in an oppositely pivoted direction, an interconnection between said first and one of the second and third hinge rods preventing opening of said twelfth hole when said third hinge rod is in its normally resiliently pivoted position, and an interconnection between said second and third hinge rods preventing opening of said B flat tone hole when said third hinge rod is pivoted against its resilient biasing means by closing of said other tone hole.*

*6. In alto and bass clarinets of the type having a body and a curved neck extending from the body without a tone hole therein, the provision of tone producing mechanism comprising an octave hole in the body adjacent the upper edge thereof, an octave pad for controlling the octave hole, a link carrying said octave pad at one end thereof, an upper longitudinal hinge rod to which the other end of said link is attached for pivotal movement of the pad about the longitudinal*

*axis of said upper hinge rod, a B flat hole below said octave hole and at the same side of said upper hinge rod, intermediate and lower hinge rods axially aligned with said upper hinge rod, a B flat key cup for controlling the B flat hole, a link connecting said B flat key cup to said intermediate hinge rod for similar pivotal movement in controlling the B flat opening, an F sharp hole, an F sharp key cup controlling the F sharp hole and connected to said lower hinge rod by a transverse link for pivotal movement about the axis thereof, a spatula key extending parallel to said hinge rods with the finger portion thereof disposed adjacent the F sharp key cup, links extending transversely of the upper and intermediate hinge rods into cooperative position with regard to the adjacent end of said spatula key, separate spring means tending to close the octave pad whereby separate operation of the spatula key or the F sharp key cup will not result in opening of the octave pad, and further spring means operable to open the octave pad upon simultaneous depression of both said F sharp key cup and said spatula key whereby the transverse links connected to the upper and intermediate hinge rods are released.*

LEON LEBLANC.

References Cited in the file of this patent or the original patent

UNITED STATES PATENTS

| Number | Name | Date |
|---|---|---|
| 1,529,567 | Albert | Mar. 10, 1925 |
| 1,926,489 | Leblanc | Sept. 12, 1933 |
| 2,508,550 | Stubbins | May 23, 1950 |

FOREIGN PATENTS

| Number | Country | Date |
|---|---|---|
| 614,673 | France | Sept. 21, 1926 |